United States Patent [19]

Woosley et al.

[11] 4,434,360
[45] Feb. 28, 1984

[54] OPTICAL SENSING DEVICE FOR READING BAR CODE OR THE LIKE

[75] Inventors: Alan H. Woosley, Lubbock; Billy R. Masten, Shallowater, both of Tex.

[73] Assignee: Texas Instruments Incorporated, Dallas, Tex.

[21] Appl. No.: 532,815

[22] Filed: Sep. 15, 1983

Related U.S. Application Data

[63] Continuation of Ser. No. 287,838, Jul. 29, 1981, abandoned.

[51] Int. Cl.³ .............................................. G06K 7/10
[52] U.S. Cl. .................................................. 235/472
[58] Field of Search ..................... 235/472; 250/566

[56] References Cited

U.S. PATENT DOCUMENTS 3,920,959 11/1975 Wefers ............................... 235/472

Primary Examiner—Harold I. Pitts
Attorney, Agent, or Firm—Douglas A. Lashmit; Melvin Sharp; N. Rhys Merrett

[57] ABSTRACT

A single optical fiber is placed at or near the nadir of the curvilinear section of the optical surface of a light emitting device. The LED element illuminates the bar code characters on the surface of the object being read, and the reflected light is transmitted up the optical fiber to a sensory means or the like. The elements are encased in an optical plastic medium for strength and durability, and resistance to environmental extremes.

5 Claims, 2 Drawing Figures

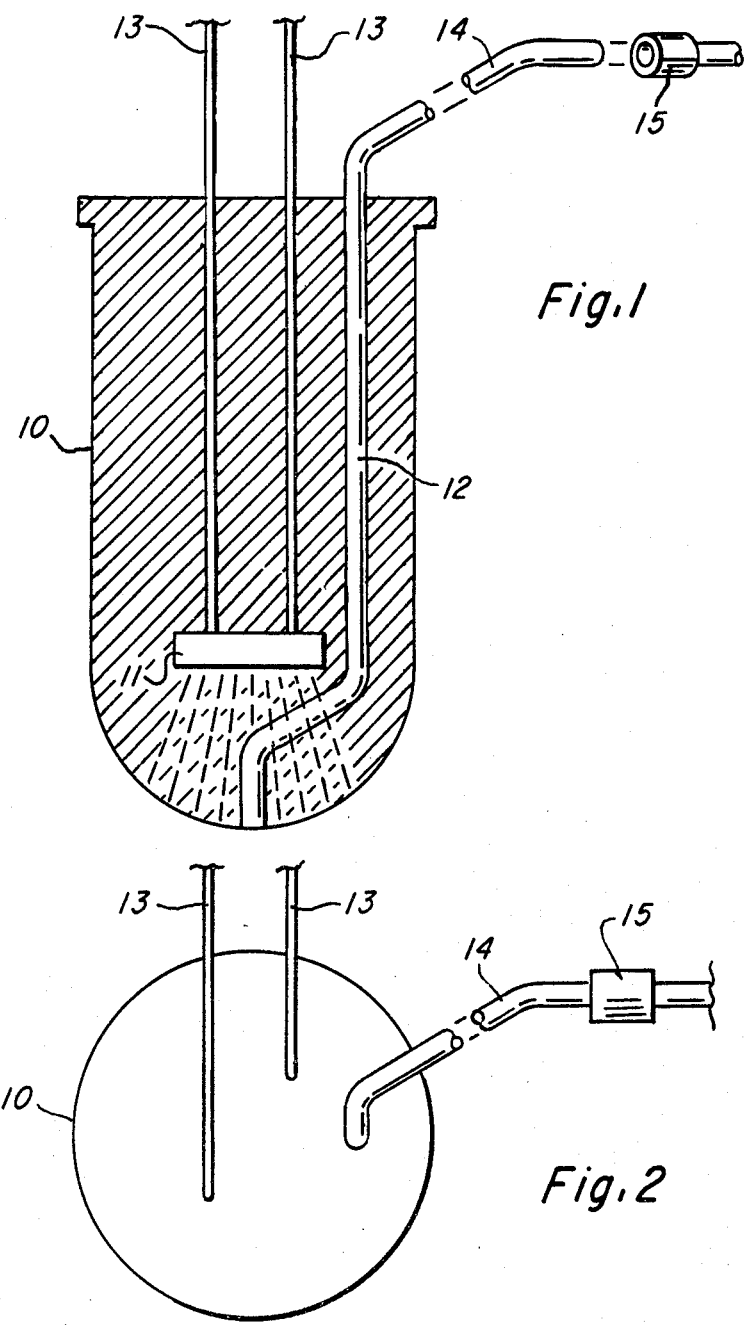

OPTICAL SENSING DEVICE FOR READING BAR CODE OR THE LIKE

This application is a continuation of application Ser. No. 287,838, filed July 29, 1981 now abandoned.

BACKGROUND OF THE INVENTION

This invention relates to electro-optical data reading devices, and more specifically, to a device for illuminating bar codes on a record surface and transmitting reflected light to a sensory device.

Data entry systems for direct entry to a processing system from a record member without a man-machine interface are well known in the prior art. Card readers, magnetic tape devices and disk files are a few of these applications. However, these are frequently quite expensive and more suited to high volume data processing. Another direct data entry system which is more apt to be suited to mechandising, inventory, and point of sale operations includes a sensor which may be stationary or mobile, for example, hand-held. A bar-code record is moved past the sensor, or in the case of the hand-held application, the sensor is moved across the record. The data is converted by a light-sensitive device to electrical signals, then processed.

To perform this operation, most systems employ an LED illumination source, and a means for transmitting the differing reflected light levels of the code bars and the record medium, usually a fiber-optic bundle, to a light-sensory means. A problem with this type of reader device has been two-fold. First, for the applications previously mentioned, the possibility of large numbers of these readers being required by a user makes low price a prime consideration. Historically, fiber optics bundles are expensive, and sometimes not easily adapted to this type use. Secondly, the fiber optic bundles have been fairly fragile, and quite susceptible to frequent damage in the environment where they would be used.

Other hand-held code readers include an LED and a sensor usually mounted in a housing of metal or plastic. U.S. Pat. Nos. 3,784,794 and 3,892,973 are made up of these components. Each requires a spherical object at the tip of the assembly for conducting light to the record medium, and conducting light reflected from the record medium to a sensor. The sensor converts the light to electrical signals, which are processed by a digital computer. These readers require complicated assembly procedures and exact positioning of elements, adding to the cost of the special parts. Also, mounting of the parts in semi-rigid housing will subject these parts to high levels of shock when exposed to abuse.

It is therefore an object of the present invention to provide an illuminator-light transfer device which is very inexpensive. Another object of this invention is to provide a device, suited for use in a bar code reader, which will be rugged and impervious to environmental extremes.

SUMMARY OF THE INVENTION

In one aspect of the present invention, there is provided a packaged LED having a single fiber optical strand therein, one end positioned on or near the rounded LED package surface. The strand is routed through the enclosure, toward the end of the device where the connections exit.

In another aspect of the invention, an LED is positioned at or near the center of the enclosure, some distance away from the point where the end of the optical fiber approaches the enclosure surface. The light from the device illuminates the code and the record medium, allowing the different reflected light levels to be transmitted up the fiber optic strand to a light sensor. Another aspect of the invention is that the device is preferably encapsulated in a tough plastic material which is transparent or translucent to the wavelength of the selected LED, and provides a rugged shell for the LED and fiber optic strand. This plastic covering provides protection for the LED and strand from moisture, heat, cold and other deleterious environmental conditions.

BRIEF DESCRIPTION OF THE DRAWINGS

FIG. 1 is a cross-sectional view of an embodiment of the present invention.

FIG. 2 is a drawing showing the connections to the LED element and the optical fiber exit from the device.

DETAILED DESCRIPTION OF THE DRAWINGS

Referring now to FIGS. 1 and 2, a preferred embodiment of the invention provides a molded plastic body 10 within which is located a light emitting element 11. A single optical fiber 12 has one end positioned at the center of the rounded end of the device body 10. This end of the fiber 12 is flush with the edge of the plastic body 10, and may be polished if necessary to achieve adequate sensitivity. The light emitter 11 is coupled to external circuitry through connector leads 13. After exiting the device body 10, the optic fiber 14 is routed to a light sensitive device 15.

The device operates very simply. The LED element is energized by a DC voltage of, for example, 5 volts and emits, for example, infrared energy, whose wavelength is not in the visible spectrum. The energy is diffused through the plastic body 10 of the device to flood out over the record medium containing the bar code or record being read. The differing level of reflection between the usually black bars and usually white spaces is transmitted up the optical fiber 12 to a light sensor responsive to the appropriate spectrum.

The plastic body 10 of the device is molded from plastic material used in fabrication of typical LED's and has no color, i.e., is clear plastic. The optical fiber strand is chosen to be the size of the smallest bar or space in the code. For example, to read a code of 0.005 width, a fiber of 0.005 width is selected. This assures adequate resolution and efficient data input to a system.

A primary advantage of this device is that the sensing device is very close to the record medium, and little, if any, light attenuation is present at the interface between the optic fiber and the record, or in the optic fiber. This allows for lower levels of illumination, and more reliable data input. Another advantage is that this device is very inexpensive and does not require extensive additional circuitry to implement in a data input system.

What is claimed is:

1. An optical sensing device for reading data codes, comprising:

a light source affixed within a transparent or translucent package;

a single strand of optical fiber material having a diameter substantially equal to the minimum width of the bars contained in the desired bar code, wherein said package comprises a solid plastic body having a flat end and a rounded end, and wherein said fiber optic strand extends through at least a portion of said body such that one end of said strand is flush with and imbedded in said rounded end of said body to receive light reflected from said codes.

2. An optical sensing device as in claim 1 wherein said light source comprises a light-emitting diode device.

3. An optical sensing device as in claim 2 wherein said light-emitting diode device emits energy in the infrared wave length spectrum.

4. An optical sensing device as in claim 2 wherein said light emitting-diode device emits energy in the visible light wave length spectrum.

5. An optical sensing device as in claim 1 wherein said single optical fiber has a diameter no greater than 0.005".

* * * * *